(12) United States Patent
Cheng

(10) Patent No.: US 7,224,803 B2
(45) Date of Patent: May 29, 2007

(54) METHOD AND DEVICE FOR ENCRYPTION AND DECRYPTION

(75) Inventor: Sheng-Yuan Cheng, Hsinchu (TW)

(73) Assignee: ADMtek Incorporated, Hsinchu (TW)

( * ) Notice: Subject to any disclaimer, the term of this patent is extended or adjusted under 35 U.S.C. 154(b) by 776 days.

(21) Appl. No.: 10/114,684

(22) Filed: Apr. 1, 2002

(65) Prior Publication Data
US 2003/0059052 A1    Mar. 27, 2003

(30) Foreign Application Priority Data
Sep. 25, 2001 (TW) ............................. 90123649 A

(51) Int. Cl.
*H04L 9/12* (2006.01)
(52) U.S. Cl. ....................... 380/277; 380/270
(58) Field of Classification Search ............... 380/42, 380/36, 37, 273, 260, 270, 277
See application file for complete search history.

(56) References Cited

U.S. PATENT DOCUMENTS

2002/0009199 A1* 1/2002 Ala-Laurila et al. ........ 380/247
2003/0095663 A1* 5/2003 Nelson et al. .............. 380/270
2003/0210787 A1* 11/2003 Billhartz et al. ............ 380/270
2003/0219129 A1* 11/2003 Whelan et al. ............. 380/270

\* cited by examiner

*Primary Examiner*—Matthew Smithers

(57) ABSTRACT

An encryption and decryption method applied upon transmitting a plaintext in a communication network containing plural subscriber ends is provided. The method includes steps of: picking a synchronization variation secret key from a first subscriber end, the value of the synchronization variation secret key synchronously varying at the subscriber ends; executing a first operation on the synchronization variation secret key by the first subscriber end to obtain an automatically changed secret key; utilizing the automatically changed secret key to process a subsequent encryption to the plaintext by the first subscriber end so as to obtain a ciphertext to be transmitted to a second subscriber end; receiving the ciphertext and picking the synchronization variation secret key by the second subscriber end to execute the first operation and obtain the automatically changed secret key; and utilizing the automatically changed secret key to process a subsequent decryption to the ciphertext by the second subscriber end so as to obtain the plaintext.

18 Claims, 3 Drawing Sheets

METHOD AND DEVICE FOR ENCRYPTION AND DECRYPTION

FIELD OF THE INVENTION

This invention relates to a method and device for encryption and decryption, and more particularly to be applied upon transmitting a plaintext in a communication network containing plural subscriber ends.

BACKGROUND OF THE INVENTION

Because the utilization of the Internet is raised more and more in families and enterprises, the situation of sharing resources by a local area network (LAN) constituted by plural personal computers 11 through a switch 10 becomes more and more popular. For reducing the trouble occurred upon the wiring construction in building up a network, the wireless network device seems to be a better way to solve this problem (please refer to FIG. I showing the relevant schematical view). Among these, the 802.11 is a standard appointed by the IEEE in 1997 and used in common for the wireless network. For solving the problem about the signals being intercepted to then cause the plaintext to be tapped when being transmitted wirelessly, the 802.11 appoints the wired equivalent privacy (WEEP) as the mode for encryption. Please refer to FIG. 2 which is a block diagram showing the function of the WEP encryption mode. The system manager has to appoint a set of secret keys having the length of 40 bits in advance, and then when some subscriber end wants to transmit a plaintext through the wireless network, the system manager will read the preset secret key, add a random produced initialization vector (IV) having a length of 24 bits to constitute a 64 bits WEP seed, and then execute WEP encryption algorithm to produce a key sequence. Additionally, after the plaintext is executed by an integrity check algorithm in an integrity check operator 21, an integrity check value (ICV) is produced to be attached to the plaintext. Thus, when the transmission end wants to process the plaintext transmission, an exclusive OR (XOR) operator 22 will execute an XOR operation for the key sequence and the plaintext containing the ICV to produce a ciphertext. As to the random produced IV, it is attached to the ciphertext without encryption, and the IV and the ciphertext are transmitted altogether to the receiving end. After receiving the signal, the receiving end operates the prestored known 40 bits secret key with the received IV to produce the same key sequence, so as to decrypt the ciphertext for obtaining the plaintext.

In the method described above, because all the IV, WEP encryption algorithm, and the XOR operation are public informations, the variation of the IV is limited, and the executive program of high level network protocol is fixed, the secret key can be easily decrypted by the eavesdropper under sufficient time and database. For avoiding the decryption of the secret key, the system manager has to change the user secret keys all the time. Consequently, the burden of the system manager is cumulated more and more, and actually this ideal is also hard to be achieved. Thus, it is therefore tried by the present application to deal with this situation.

SUMMARY OF THE INVENTION

It is an object of the present invention to provide a method and device for encryption and decryption and being applied upon transmitting a plaintext in a communication network containing plural subscriber ends.

It is another object of the present invention to provide a method for the system manager to automatically change the secret key at periodic time points.

It is another further object of the present invention to provide a solution for solving the problem about the plaintext being tapped easily when transmitted through the wireless network.

The present invention provides an encryption and decryption method applied upon transmitting a plaintext in a communication network containing plural subscriber ends, which comprises steps of: picking a synchronization variation secret key from a first subscriber end, the synchronization variation secret key having a value synchronously varying at the subscriber ends; executing a first operation on the synchronization variation secret key by the first subscriber end to obtain an automatically changed secret key; utilizing the automatically changed secret key to process a subsequent encryption to the plaintext by the first subscriber end so as to obtain a ciphertext to be transmitted to a second subscriber end; receiving the ciphertext and picking the synchronization variation secret key by the second subscriber end to execute the first operation and obtain the automatically changed secret key; and utilizing the automatically changed secret key to process a subsequent decryption to the ciphertext by the second subscriber end so as to obtain the plaintext.

Preferably, the communication network is a wireless communication network.

Preferably, the synchronization variation secret key is a count value produced by a timing synchronization function timer (TSFT) of each the subscriber end at a fixed periodic initial point.

Preferably, the first operation comprises steps of: picking an initial secret key prestored in the first subscriber end; and operating the synchronization variation secret key and the initial secret key by a wired equivalent privacy (WEP) encryption algorithm to obtain the automatically changed secret key.

Preferably, the subsequent encryption comprises steps of: providing a random produced initialization vector; executing a second operation for the initialization vector and the automatically changed secret key to obtain a key sequence; and executing an exclusive OR (XOR) operation with the key sequence for the plaintext attached with an integrity check value (ICV) and adding the initialization vector thereto for obtaining the ciphertext.

Preferably, the integrity check value (ICV) is produced by operating the plaintext through an integrity check algorithm.

Preferably, the integrity check algorithm proceeds a cyclic redundancy check 32 (CRC 32) operation.

Preferably, the second operation is completed by a wired equivalent privacy (WEP) encrypted algorithm. WEP uses the RC4 PRNG algorithm.

Preferably, the subsequent decryption comprises steps of: obtaining the initialization vector from the ciphertext; executing the second operation for the initialization vector and the automatically changed secret key to obtain a key sequence; and executing an exclusive OR (XOR) operation with the key sequence for the ciphertext without the initialization vector to obtain the plaintext attached with the integrity check value (ICV).

In accordance with another aspect of the present invention, an encryption and decryption device applied upon transmitting a plaintext in a communication network containing a first subscriber end and a second subscriber end, which comprises: a first synchronization variation secret key generator mounted in the first subscriber end for producing a synchronization variation secret key; a first secret key operator electrically connected to the first synchronization variation generator for executing a first operation on the synchronization variation secret key produced by the first synchronization variation secret key generator to obtain an automatically changed secret key; an encryption operator electrically connected to the first secret key operator for utilizing the automatically changed secret key to process a subsequent encryption to the plaintext so as to obtain a ciphertext to be transmitted to a second subscriber end; a second synchronization variation secret key generator mounted in the second subscriber end for producing the synchronization variation secret key synchronously with the first synchronization variation secret key generator; a second secret key operator electrically connected to the second synchronization variation secret key generator for picking the synchronization variation secret key produced by the second synchronization variation secret key generator to be executed by the first operation to obtain the automatically changed secret key; and a decryption operator electrically connected to the second secret key operator for utilizing the automatically changed secret key to process a subsequent decryption to the ciphertext to obtain the plaintext.

Preferably, the communication network is a wireless communication network.

Preferably, the first synchronization variation secret key generator is a timing synchronization function timer (TSFT) and the synchronization variation secret key is a count value produced by the first synchronization variation secret key generator at a fixed periodic initial point.

Preferably, the first operation executed by the first secret key operator comprises steps of: picking an initial secret key prestored in the first subscriber end; and operating the synchronization variation secret key and the initial secret key by a wired equivalent privacy (WEP) encryption algorithm to obtain the automatically changed secret key.

Preferably, the encryption operator comprises: a key sequence operator for executing a second operation for a random initialization vector and the automatically changed secret key to obtain a key sequence; and an exclusive OR (XOR) operator for utilizing the key sequence to execute an XOR operation for the plaintext attached with an integrity check value and adding the initialization vector to obtain the ciphertext.

Preferably, the integrity check value is produced by executing an integrity check algorithm with the plaintext through an integrity check operator.

Preferably, the integrity check algorithm proceeds a cyclic redundancy check 32 (CRC 32) operation.

Preferably, the key sequence operator is completed by a wired equivalent privacy (WEP) encryption algorithm. WEP uses the RC4 PRNG algorithm.

Preferably, the decryption device comprises: a key sequence operator for obtaining the initialization vector through the ciphertext and executing the second operation for the initialization vector and the automatically variation secret key to obtain the key sequence; and an exclusive OR (XOR) operator for utilizing the key sequence to execute an XOR operation for the ciphertext without the initialization vector to obtain the plaintext attached with the integrity check value.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

Figure 1:
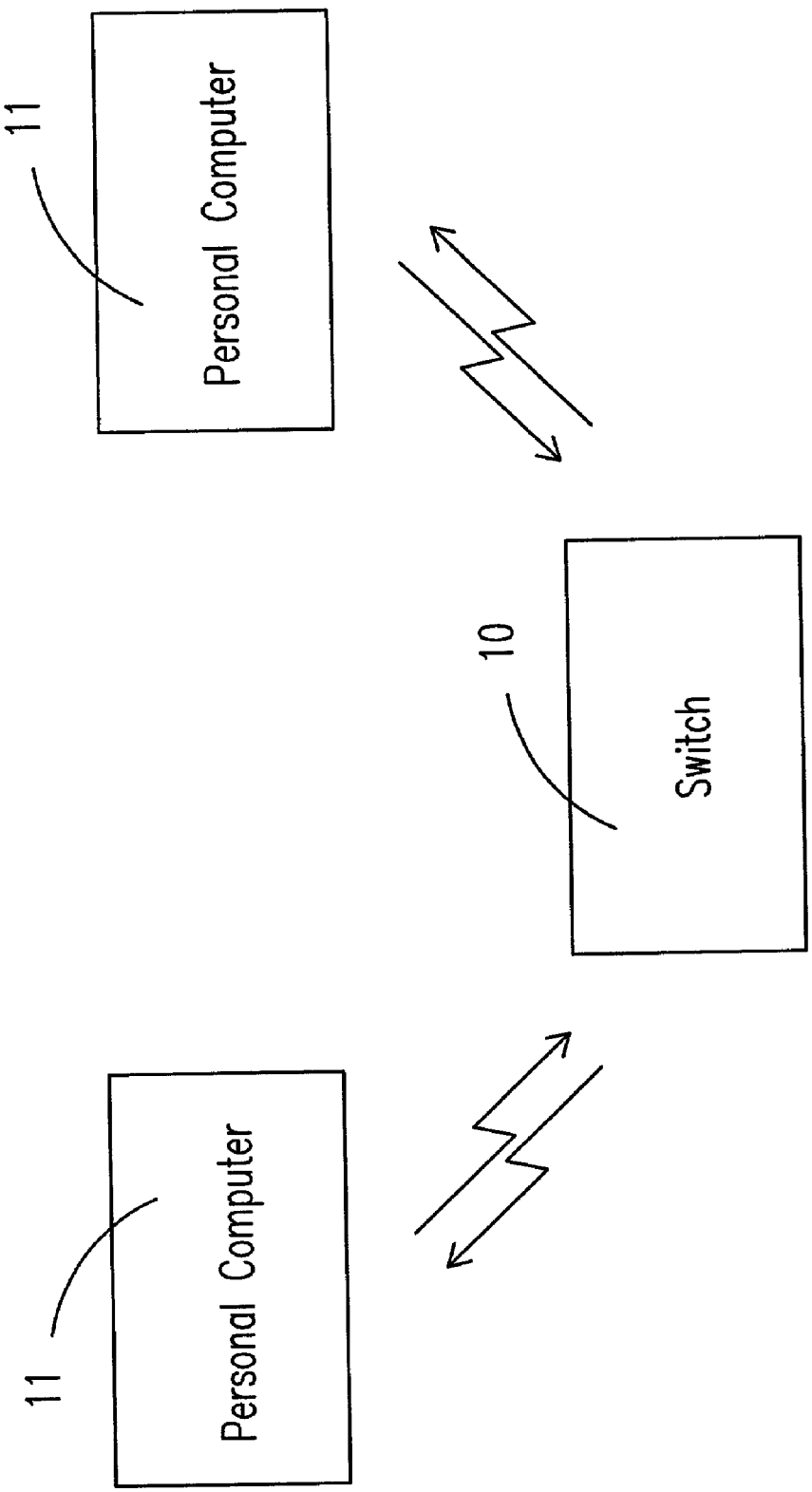
FIG. 1 is a framework diagram showing the wireless network apparatus in the prior art.
Figure 2:
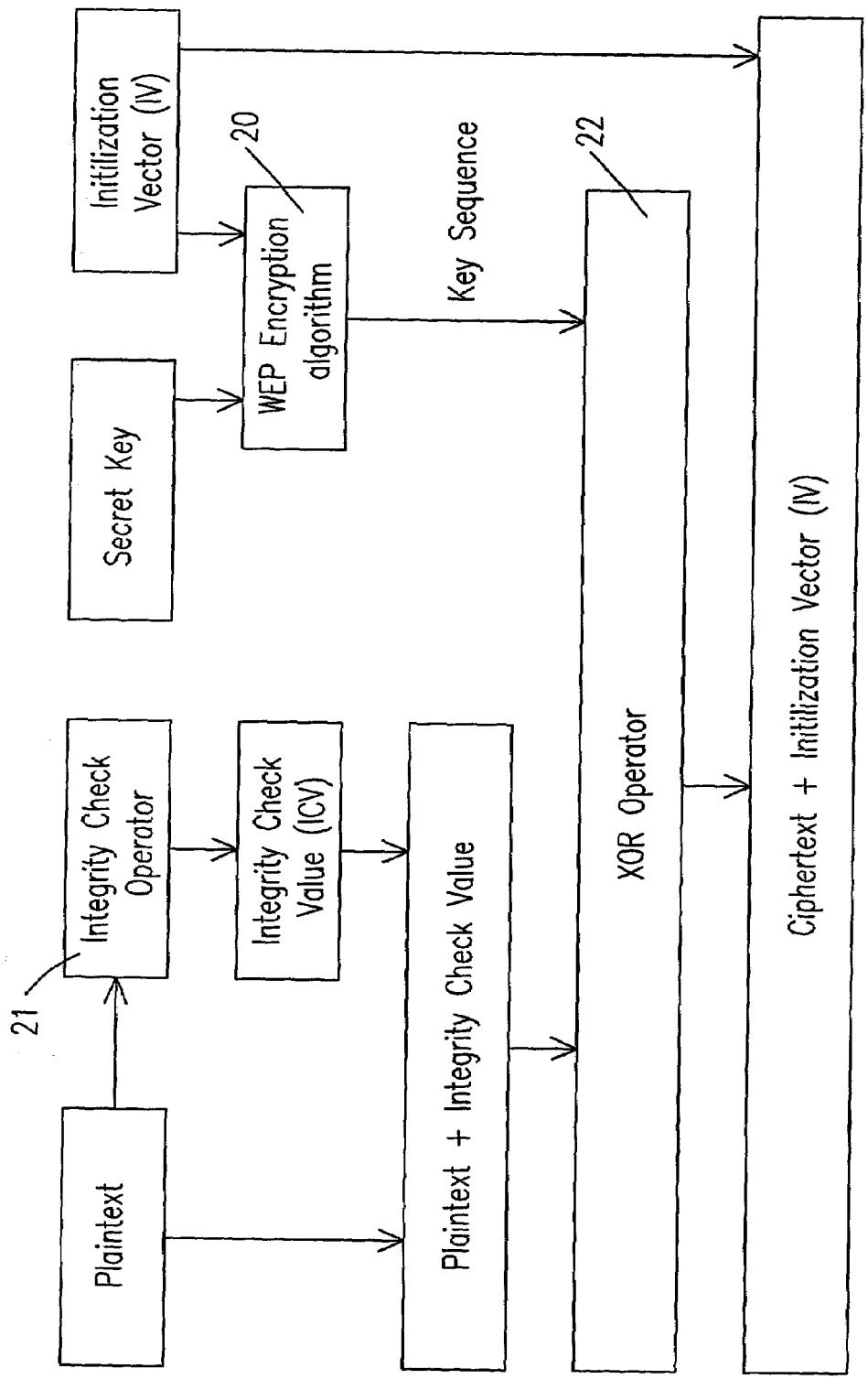
FIG. 2 is a block diagram showing the encryption function of the WEP appointed by the 802.11 in the prior art.
Figure 3:
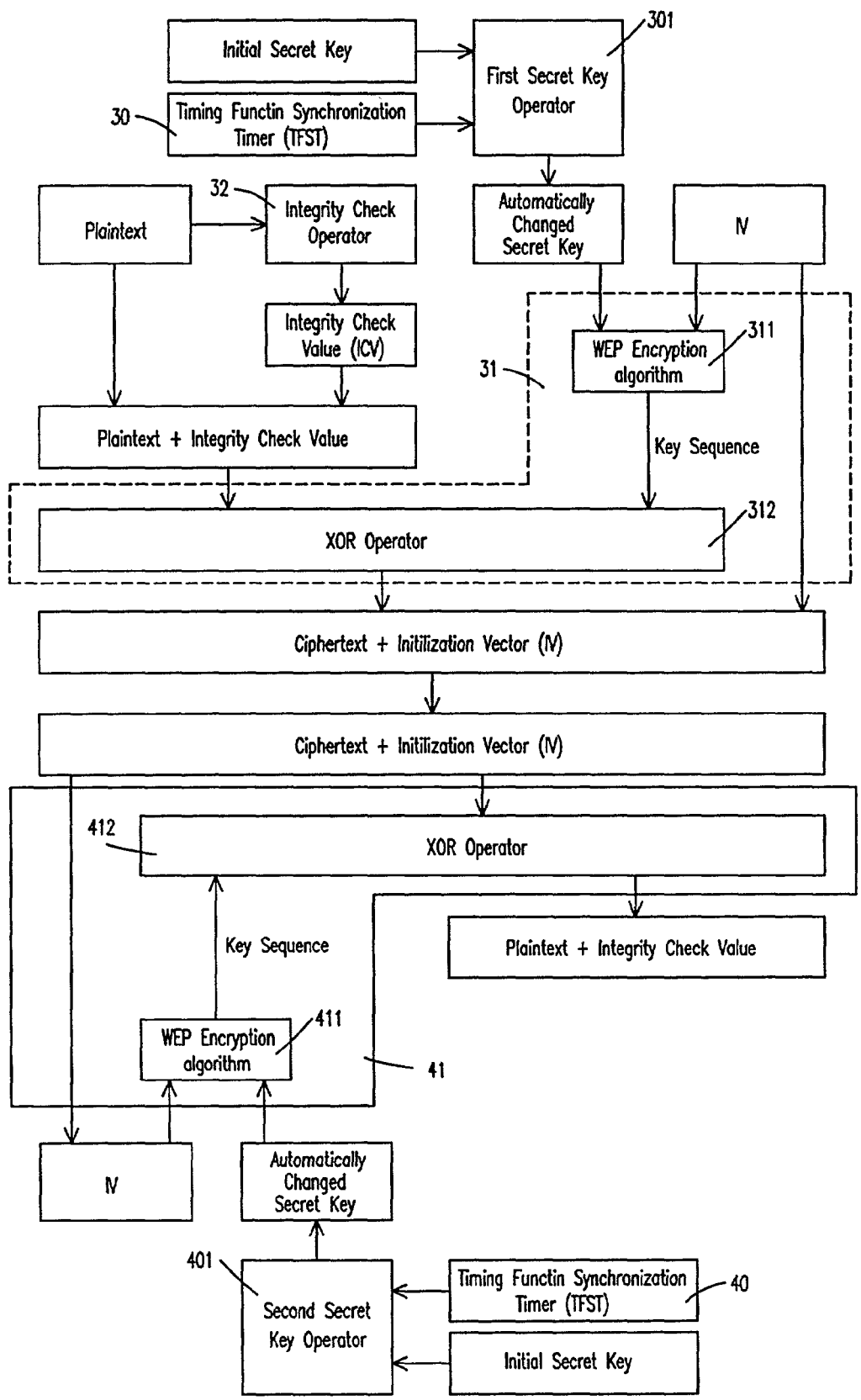
FIG. 3 is a block diagram showing a preferred embodiment of an architecture according to the present application.

Please refer to FIG. 3 showing the block diagram of a preferred embodiment of an architecture according to the present application. Similarly, in the preferred embodiment, the system manager also need to appoint a set of initial secret keys having a length of 40 bits to be prestored in each subscriber end. When some subscriber end tries to transmit a plaintext through the wireless network, the preset initial secret key is read out and is accompained with a synchronization variation secret key outputted by a timing synchronization function timer (TSFT) 30 to be executed by a first operation through a first secret key operator 301, so as to obtain an automatically changed secret key (whose length is also 40 bits). The WEP encryption algorithm 311 included in the encryption operator 31 of the subscriber end executes a second operation for a 24 bits initialization vector randomly produced by the system and the automatically changed secret key to obtain a key sequence. At this time, an integrity check operator 32 of the subscriber end executes an integrity check algorithm with the plaintext to obtain an integrity check value (ICV), and then the ICV is attached to the plaintext. After the XOR operator 312 included in the encryption operator 31 executes an XOR operation for the plaintext attached by the ICV and the key sequence, the IV is then also attached to obtain a ciphertext to be transmitted to a receiving subscriber end.

After the receiving subscriber end receives the ciphertext, the receiving subscriber end reads out the preset initial secret key and is accompanied with the synchronization variation secret key outputted by its TSFT 40 to be executed by the first operation through a second secret key operator 401 so as to obtain the automatically changed secret key. The WEP encryption algorithm 411 included in the decryption operator 41 of the receiving subscriber end executes the second operation for the initialization vector attached to the ciphertext and the automatically changed secret key to obtain the key sequence. Furthermore, after executing an XOR operation for the key sequence and the IV removed ciphertext by an XOR operator 412, the plaintext attached with the ICV is obtained.

Regarding the above described first and second operations executed by the first secret key operator 301, the second secret operator 401, the WEP encryption algorithm 311, and the WEP encryption algorithm 411, these two operations can be completed by the WEP encryption algorithm originally provided by the standard 802.11. The integrity check algorithm can actually be completed by a cyclic redundancy check 32 (CRC 32) operation. The main feature of the present application is to produce the synchronization variation secret key by a timing synchronization function timer (TSFT) originally set in the standard 802.11 of the each subscriber end. Because the 802.11 regulates that the TSFT of each subscriber end must be counted synchronously with the system, the system manager only needs to preset a period for the secret key renewal and then each subscriber end can automatically read the count value outputted by the TSFT at the initial time point of each fixed period as the synchronization variation secret key. Taking one hour as an example, in every hour, each subscriber end automatically reads the count value outputted by the TSFT as the synchronization variation secret key. According to those described above, the action of updating the secret key automatically and synchronously can be achieved, and moreover, the known drawback of the secret key being decrypted easily can be overcome. Furthermore, the method according to the present application is compatible with the 802.11 protocol, and the function for permitting the new subscriber end to randomly enter the system can be achieved, too.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An encryption and decryption method applied upon transmitting a plaintext in a communication network containing plural subscriber ends, said method comprising steps of:
   picking a synchronization variation secret key from a first subscriber end, said synchronization variation secret key having a value synchronously varying at said subscriber ends;
   executing a first operation on said synchronization variation secret key by said first subscriber end to obtain an automatically changed secret key;
   utilizing said automatically changed secret key to process a subsequent encryption to said plaintext by said first subscriber end so as to obtain a ciphertext to be transmitted to a second subscriber end;
   receiving said ciphertext and picking said synchronization variation secret key by said second subscriber end to execute said first operation and obtain said automatically changed secret key; and
   utilizing said automatically changed secret key to process a subsequent decryption to said ciphertext by said second subscriber end so as to obtain said plaintext.

2. An encryption and decryption method according to claim 1 wherein said communication network is a wireless communication network.

3. An encryption and decryption method according to claim 1 wherein said synchronization variation secret key is a count value produced by a timing synchronization function timer (TSFT) of each said subscriber end at a fixed periodic initial point.

4. An encryption and decryption method according to claim 1 wherein said first operation comprises steps of:
   picking an initial secret key prestored in said first subscriber end; and
   operating said synchronization variation secret key and said initial secret key by a wired equivalent privacy (WEP) encryption algorithm to obtain said automatically changed secret key.

5. An encryption and decryption method according to claim 1 wherein said subsequent encryption comprises steps of:
   providing a random produced initialization vector;
   executing a second operation for said initialization vector and said automatically changed secret key to obtain a key sequence; and
   executing an exclusive OR (XOR) operation with said key sequence for said plaintext attached with an integrity check value (ICV) and adding said initialization vector thereto for obtaining said ciphertext.

6. An encryption and decryption method according to claim 5 wherein said integrity check value (ICV) is produced by operating said plaintext through an integrity check algorithm.

7. An encryption and decryption method according to claim 6 wherein said integrity check algorithm proceeds a cyclic redundancy check 32 (CRC 32) operation.

8. An encryption and decryption method according to claim 5 wherein said second operation is completed by a wired equivalent privacy (WEP) encryption algorithm.

9. An encryption and decryption method according to claim 5 wherein said subsequent decryption comprises steps of:
   obtaining said initialization vector from said ciphertext;
   executing said second operation for said initialization vector and said automatically changed secret key to obtain a key sequence; and
   executing an exclusive OR (XOR) operation with said key sequence for said ciphertext without said initialization vector to obtain said plaintext attached with said integrity check value (ICV).

10. An encryption and decryption device applied for transmitting a plaintext in a communication network containing a first subscriber end and a second subscriber end, said device comprising:
    a first synchronization variation secret key generator mounted in said first subscriber end for producing a synchronization variation secret key;
    a first secret key operator electrically connected to said first synchronization variation generator for executing a first operation on said synchronization variation secret key produced by said first synchronization variation secret key generator to obtain an automatically changed secret key;
    an encryption operator electrically connected to said first secret key operator for utilizing said automatically changed secret key to process a subsequent encryption to said plaintext so as to obtain a ciphertext to be transmitted to a second subscriber end;
    a second synchronization variation secret key generator mounted in said second subscriber end for producing said synchronization variation secret key synchronously with said first synchronization variation secret key generator;
    a second secret key operator electrically connected to said second synchronization variation secret key generator for picking said synchronization variation secret key produced by said second synchronization variation secret key generator to be executed by said first operation to obtain said automatically changed secret key; and
    a decryption operator electrically connected to said second secret key operator for utilizing said automatically changed secret key to process a subsequent decryption to said ciphertext to obtain said plaintext.

11. An encryption and decryption device according to claim 10 wherein said communication network is a wireless communication network.

12. An encryption and decryption device according to claim 10 wherein said first synchronization variation secret key generator is a timing synchronization function timer (TSFT) and said synchronization variation secret key is a count value produced by said first synchronization variation secret key generator at a fixed periodic initial point.

13. An encryption and decryption device according to claim 10 wherein said first operation executed by said first secret key operator and said second secret key operator comprises steps of:
    picking an initial secret key prestored in said first subscriber end; and
    operating said synchronization variation secret key and said initial secret key by a wired equivalent privacy (WEP) encryption algorithm to obtain said automatically changed secret key.

14. An encryption and decryption device according to claim 10 wherein said encryption operator comprises:
    a key sequence operator for executing a second operation for a random initialization vector and said automatically changed secret key to obtain a key sequence; and
    an exclusive OR (XOR) operator for utilizing said key sequence to execute an XOR operation for said plaintext attached with an integrity check value and adding said initialization vector to obtain said ciphertext.

15. An encryption and decryption device according to claim 14 wherein said integrity check value is produced by executing an integrity check algorithm with said plaintext through an integrity check operator.

16. An encryption and decryption device according to claim 15 wherein said integrity check algorithm proceeds a cyclic redundancy check 32 (CRC 32) operation.

17. An encryption and decryption device according to claim 15 wherein said key sequence operator is completed by a wired equivalent privacy (WEP) encryption algorithm.

18. An encryption and decryption device according to claim 15 wherein said decryption device comprises:
    a key sequence operator for obtaining said initialization vector through said ciphertext and executing said second operation for said initialization vector and said automatically variation secret key to obtain said key sequence; and
    an exclusive OR (XOR) operator for utilizing said key sequence to execute an XOR operation for said ciphertext without said initialization vector to obtain said plaintext attached with said integrity check value.

* * * * *